US006680967B1

United States Patent
Westman (10) Patent No.: US 6,680,967 B1
(45) Date of Patent: Jan. 20, 2004

(54) RECEIVER

(75) Inventor: Tapani Jari Westman, Kempele (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/377,570

(22) Filed: Aug. 19, 1999

(30) Foreign Application Priority Data

Aug. 21, 1998 (GB) ............................................ 9818378

(51) Int. Cl.⁷ ............................ H04B 1/707; H04L 1/02
(52) U.S. Cl. ..................... 375/148; 375/144; 375/347; 375/349
(58) Field of Search ................................. 375/316, 140, 375/147, 324, 325, 340, 346, 349, 144, 148, 347, 260, 267; 455/132

(56) References Cited

U.S. PATENT DOCUMENTS

| 5,544,156 | A | * | 8/1996 | Teder et al. ................ 370/342 |
|---|---|---|---|---|
| 5,584,295 | A | * | 12/1996 | Muller et al. ............... 600/300 |
| 5,619,524 | A | * | 4/1997 | Ling et al. .................. 375/130 |
| 5,654,980 | A |   | 8/1997 | Latva-aho et al. .......... 375/208 |
| 5,697,084 | A | * | 12/1997 | Tingley .................... 455/276.1 |
| 5,715,279 | A |   | 2/1998 | Laakso et al. .............. 375/224 |
| 5,757,846 | A |   | 5/1998 | Vasudevan .................. 375/200 |
| 6,067,315 | A | * | 5/2000 | Sandin ....................... 370/209 |
| 6,263,307 | B1 | * | 7/2001 | Arslan et al. ............... 704/205 |

FOREIGN PATENT DOCUMENTS

| EP | 0449327 A2 | 10/1991 |
|---|---|---|
| EP | 0551081 A2 | 7/1993 |
| EP | 0715440 A1 | 6/1996 |
| GB | 2280575 | 2/1995 |
| WO | WO 98/11750 | 3/1998 |

OTHER PUBLICATIONS

"Adaptive Parametere Estimation Using Parallel Kalman Filtering For Spread Spectrum Code And Doppler Tracking", Fuxjaeger et al., IEEE Transactions on Communications, vol. 42, No. 6.
"User Authentication In Mobile Telecommunication Environments Using Voice Biometrics And Smartcards", Lapere et al., Intelligence in Services and Networks, pp. 437–443.
Patent Abstracts of Japan, No. 05103068.
United Kingdom Search Report.

* cited by examiner

Primary Examiner—Young T. Tse
Assistant Examiner—David B. Lugo
(74) Attorney, Agent, or Firm—Perman & Green, LLP (57) ABSTRACT

A receiver for use in a wireless communication system, for example a mobile phone system, the receiver having a plurality of fingers which can each receive signals from a different propagation path and can estimate the channel coherence time for the propagation path used by signals received by the respective finger. The receiver also has filtering circuity the operation of which is altered in dependence on the estimated coherence time.

21 Claims, 5 Drawing Sheets

RECEIVER

FIELD OF THE INVENTION

The present invention relates to a receiver and, in particular but not exclusively, to a RAKE receiver for use in a cellular telecommunications network. The cellular telecommunications network may, but not necessarily, use code division multiple access (CDMA).

BACKGROUND OF THE INVENTION

When a signal is transmitted from a base station to a mobile station or vice versa, the signal will follow a number of different paths (multipaths) due reflections of the signals from buildings or the like. Thus the same signal will arrive at its destination mobile station or base station at different times, depending on the length of the path travelled. RAKE receivers are known and are generally used to resolve this problem. In RAKE receivers, a different one of the propagation paths is assigned to different fingers of the RAKE receiver and these signals are then combined to provide a single signal. However, if the mobile station is moving or if vehicles or people are moving near the mobile or base transceiver stations, this will result in changes in the relative phases of the different multipath signals. This in turn causes the power of the combined single signal to fluctuate. Without these movements the channel impulse response would remain generally constant. Accordingly, the rate of change of the channel impulse response is related to the speed of the movements mentioned hereinbefore.

Relative movement of the base and mobile stations causes Doppler shifts in the various multipath signals which gives rise to Doppler spread in the received signal. This can be viewed as spreading of the transmitted signal frequency. The Doppler spread in the received signal is related to the rate of fluctuations in the received signals. The reciprocal of the Doppler spread is the coherence time of the channel which is the time interval over which a transmitted symbol will be relatively undisturbed by channel fluctuations. The relative speed of a mobile station relative to a base station provides a measure of the coherence time of the channel.

In known RAKE receivers, each finger includes a smoothing filter. However the characteristics of these filters are fixed. This gives rise to the problem that the RAKE receiver only provides optimum results when the coherence time of the channel is within a limited range of values. This means that with some coherence time values, the output of the RAKE receiver is degraded as a result of the poorer filtering by the smoothing filter.

In a code division multiple access system, soft handoff is used. With soft handoff, a mobile station communicates with more than one base station at a time. Different fingers of the RAKE receiver may therefore be allocated to receive signals from different base stations. Accordingly the coherence time of the channels for the signals from the two different base stations may be quite different. According at least one of the signals from one of the base stations may not be processed in an optimal manner. This means that the quality of the combined signal may be reduced.

It is therefore an aim of embodiments of the present invention to reduce or at least mitigate the problems mentioned hereinbefore.

SUMMARY OF THE INVENTION

According to one aspect of the present invention, there is provided a receiver for use in a wireless communication system, said receiver comprising a plurality of receiver means, said plurality of receiver means each being arranged to receive signals from a different propagation path, each of said receiver means comprising means for estimating the channel coherence time for the propagation path used by signals received by the respective receiver means and filtering means, wherein the operation of the filtering means is altered in dependence on the coherence time estimate provided by the estimating means.

As the filtering means is altered in dependence on the coherence time estimate provided by the estimating means, the filtering operation provided by the filtering means can be optimized to reduce the effects of noise.

Preferably, the receiver is a rake receiver and said receiver means comprise fingers.

Preferably, tap coefficients for said filtering means are alterable in dependence on the coherence time estimate. Additionally or alternatively, the number of taps used by said filtering means is alterable in dependence on the coherence time estimate. In this way, the operation of the filtering means can be altered.

Preferably, the filtering means has the characteristic that the mean square error of the signal is minimised. The filtering means may therefore comprise a Wiener filter.

However, other types of filter can be used. For example, the filtering means of each receiver means may comprise a finite impulse response filter or an infinite impulse response filter.

The receiver may be incorporated in a mobile station. Preferably, the estimating means estimates the coherence time of the channel of the propagation path associated with the respective receiver means based on a parameter indicative of the movement of the mobile station. Movement of the mobile station will be an important factor in the changing of the coherence time.

As the coherence time estimate is based on a parameter indicative of the movement of the mobile station, a reasonable estimate of the coherence time can be obtained. The parameter indicative of the movement of the mobile station may be defined by a ratio of a first autocorrelation of a channel impulse response, with no delay, for the propagation path associated with a given receiver means and a second autocorrelation of said channel impulse response with a given delay. This has the advantage that it can be simply implemented using only a few components.

Preferably, the first and second auto correlations are average values. Thus, the effects of any anomalous values can be reduced.

Preferably, the output of the filtering means is used to control a phase alteration applied to the received signals. The phase alteration applied to the received signals allows coherent combining of the signals received via different receiver means. The better that the filtering means is able to reduce the effects of noise, the better the phase alteration applied to the received signal.

Preferably, the estimating means is arranged to receive a plurality of channel impulse responses for said received signal, said channel impulse estimates being used by said estimating means to estimate the channel coherence time.

The receiver may also be incorporated in a base transceiver station. The principal of embodiments of the present invention can be used to compensate for the effects of changes in the radio environment.

Preferably, the receiver is arranged to receive signals in a code division multiple access format.

According to a second aspect of the present invention, there is provided a receiver for use in a wireless communication system, said receiver comprising a plurality of receiver means, said plurality of receiver means each being arranged to receive signals from a different propagation path, each of said receiver means comprising adaptive filtering means for filtering said received signals, wherein the operation of said adaptive filtering means is altered in dependence on a characteristic of the signals from the propagation path received by the respective receiver means.

Since the filtering means in each receiver means is individually altered in dependence on the signal received by the individual receiver means, an optimal performance of the receiver can be achieved.

Preferably, the received signals are processed prior to passing through adaptive filtering means. Preferably, the characteristic is the channel impulse response for the propagation path used by the signals received by the respective receiver.

It should be appreciated that there are features of the first aspect of the invention can be provided with the second aspect and vice versa.

For a better understanding of the invention and to show how the same may be carried into effect reference will now be made by way of example to accompanying drawings in which:

DETAILED DESCRIPTION OF THE PREFERRED EMBODIMENTS

Figure 1:
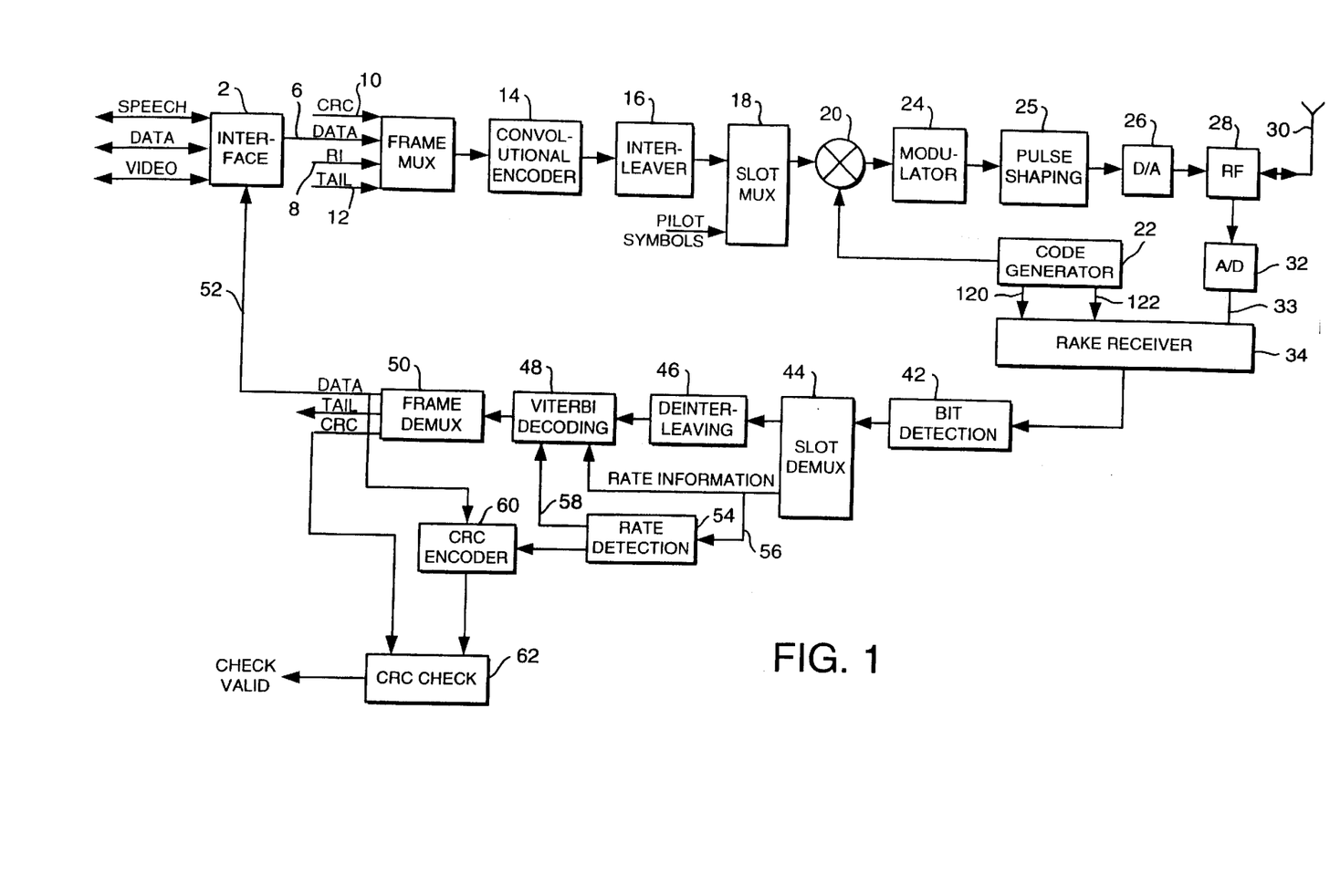
FIG. 1 shows a block diagram of transmit and receive circuitry in a mobile station.
Figure 2:
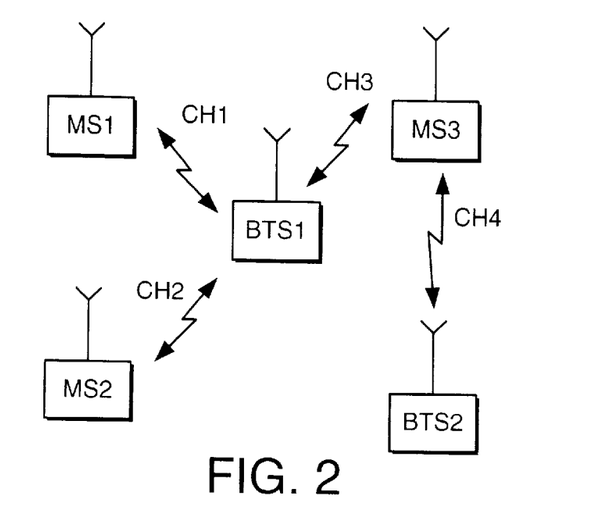
FIG. 2 shows a block diagram of a mobile communication system.

Reference will first be made to FIG. 1 which shows a block diagram of transmit and receive circuitry at a mobile station (MS) in a CDMA system and FIG. 2 which shows a block diagram illustrating a context in which the present application may be used. That is, the CDMA mobile communication system allows a plurality of mobile stations MS 1, MS 2, MS 3 to communicate with a base transceiver station BTS 1 in the common cell via respective channels CH 1, CH 2, CH 3. Mobile station MS 3 is able to communicate at the same time as it communicates with the first base transceiver station BTS 1 with a second base transceiver station BTS 2. This allows soft hand off to be achieved. Soft hand off occurs, for example when a mobile station is close to the edge of two or more adjacent cells. The mobile station MS 3 communicates with the second base transceiver station BTS 2 using the channel CH 4. The information transmitted on the channels CH 3 is the same as the information transmitted on the channel CH 4 and the same spreading code is used for both channels. In other words, the third mobile station MS 3 provides a single transmission which provides both the third and fourth channels CH 3 and CH 4. The three channels which are used to communicate with the first base transceiver station BTS 1 are distinguished from one another by the use of spreading codes in a manner which is known.

Reference will now be made to FIG. 1. The transmit circuitry within a mobile station will be described first. Data to be transmitted, which may be speech data, video data or other data is supplied to the MS interface 2. It is encoded into a form suitable for transmission. The encoded user data is supplied to a frame multiplexer 4 via line 6 together with a rate information sequence RI via line 8 which identifies the bit rate, a check sequence (CRC) for each frame of data via line 10 and an error correction tail bit defining the end of each user data sequence via line 12. The frame multiplexer 4 organises the data for transmission into a frame sequence.

The frame sequence is supplied to a convolutional encoder 14 and a bit interleaver 16. These circuits carry out convolutional encoding and bit interleaving in a manner which is known in the art and which will not be described further herein. The purposes of the convolutional encoding is to protect the user data from errors in a radio channel so that a (Viterbi) decoder can recover the coded data even if some bits are corrupted. Bit interleaving spreads burst errors which typically occur in mobile radio channels more evenly in time to allow the decoder to more efficiently correct the errors from the coded data.

At a slot multiplexer 18, pilot symbols (PS) are introduced into the time slots with the encoded data to generate a slot sequence. The pilot symbols (PS) are introduced at the beginning and end of each time slot in a coherent system. These symbols are easily recognisable and so the beginning and end of each time slot can be identified for synchronisation purposes. In a non-coherent system, these pilot symbols are not necessary.

The slot sequence is supplied to a spreader 20 which receives a spreading code from the code generator 22. The spreading code is generated in accordance with known CDMA techniques and will not be described further herein. The spreading code is unique for each mobile station transmitting to a single base station so that the transmission from individual mobile stations can be distinguished at the base station. The codes are designed to be as far as possible orthogonal between different mobile stations. If M parallel code channels are employed, M data symbols are spread using different codes.

After spreading, the spread signal is supplied to a modulator 24 which modulates the signal ready for transmission, for example according to QPSK modulation. In some systems, modulation is carried out prior to spreading. The spread, modulated signal is supplied to a pulse shaping filter 25 which shapes the digital signal into a form which is easier for a digital to analogue (D/A) converter 26 to deal with. The D/A converter 26 is connected to output of the pulse shaping filter 25. The analogue signal is input to an RF unit 28 which supplies the signal ready for transmission via an antenna 30. The RF unit 28 converts the signal from either an intermediate frequency or a base band frequency to the radio frequency. The RF unit 28 may thus comprise a mixer.

The reception side of the mobile station will now be described. Signals incoming at the antenna 30 are received by the RF unit 28 and supplied to an analogue to digital (A/D) converter 32 which converts the received analogue signal to a digital signal. The RF unit 28 may convert the received signals at the radio frequency to an intermediate or baseband frequency. It will readily be understood that a signal may arrive at the mobile station having experienced multipaths with differing propagation delays. The A/D converter 32 supplies the digital signal to a RAKE receiver 34 which will be described in more detail hereinafter. The RAKE receiver 34 also receives an input from the code generator 22.

The output of the RAKE receiver 34 is input to a bit detector 42. The bit detector 42 makes a soft or hard decision on the received symbols as to the transmitted bits. The detected bit sequence from the bit detector 42 is supplied to a slot demultiplexer 44 which demultiplexes the slot structure and provides an estimate of the transmission rate calculated by the RAKE receiver. The demultiplexed slot structure is then supplied to a deinterleaving unit 46 which effectively undoes the action of the interleaver 16. The deinterleaved signal is supplied to a Viterbi decoding unit 48 with the rate information. The decoded signal determined by the Viterbi decoding unit 48 is supplied to a frame demultiplexer 50 from which the tail bit, user data, CRC sequence and RI sequence are recovered. The user data is supplied to the transmission interface 2 along line 52.

The rate information sequence RI is supplied to a rate detection unit 54 along line 56. The rate detection unit compares the decoded rate information with the estimated rate and if there is a mismatch, a signal is supplied to the Viterbi decoding unit 48 along line 58 to allow the Viterbi decoding unit to make a different rate decision for decoding.

An additional check on the rate information, and also on the validity of the data itself, is accomplished by supplying the user data to a CRC encoder 60 which generates a CRC sequence from the received user data. The CRC sequence is checked against the CRC sequence derived from the incoming data in a CRC check unit 62. If the check is valid, then it is assumed that the rate information and the data are good. If the CRC check fails, the estimated rate supplied to the Viterbi decoding unit can be used to make a next guess at the right transmission rate for decoding.

Figure 3:
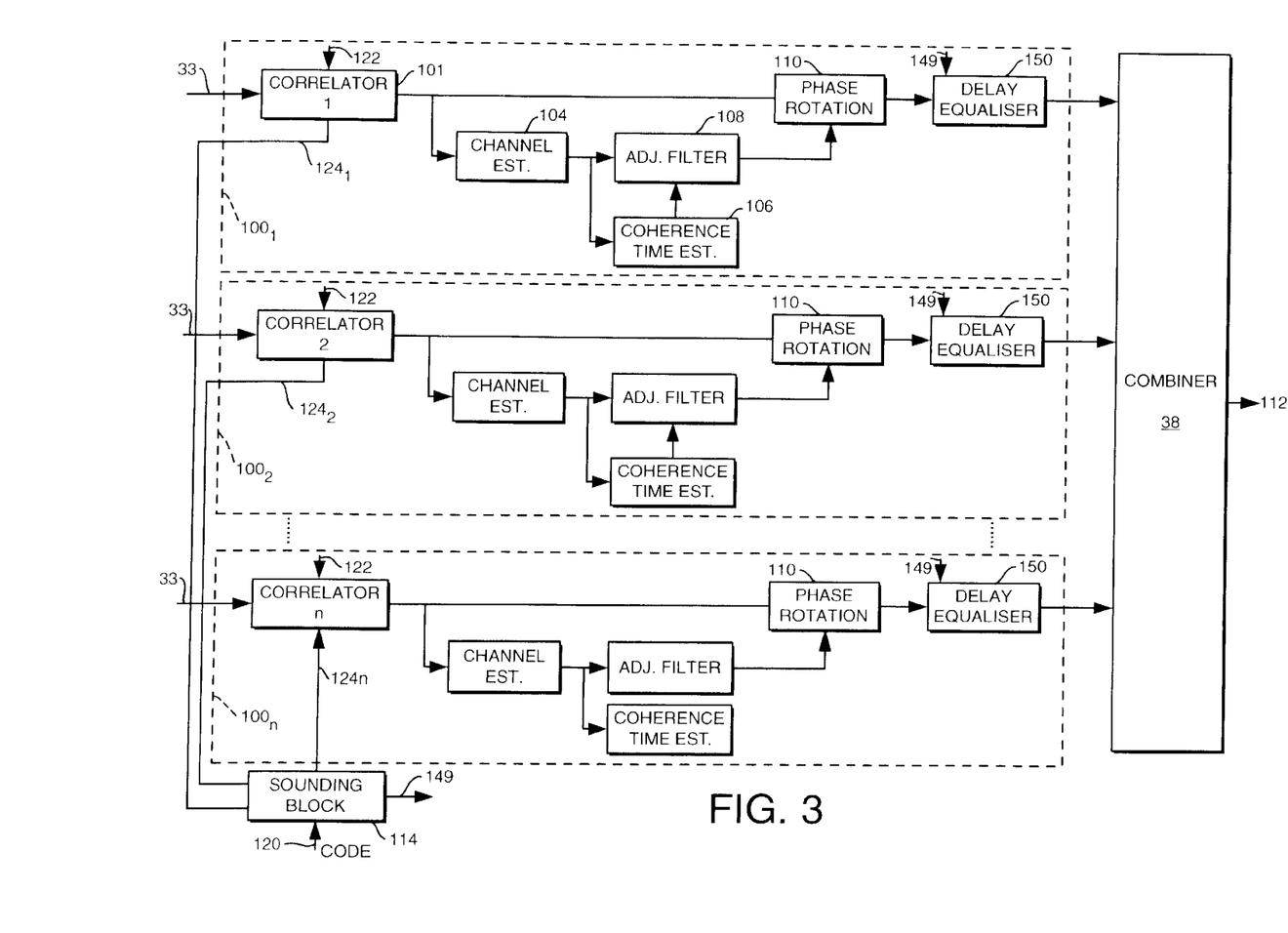
FIG. 3 shows a block diagram of the RAKE receiver.

The RAKE receiver 34 will now be described in more detail with reference to FIG. 3. The RAKE receiver 34 comprises a plurality of RAKE fingers $110_{1-n}$. The number of RAKE fingers vary in dependence on the requirements of the mobile phone. In one embodiment six fingers are provided.

Each RAKE finger 100 comprises a correlator 101, a channel estimator 104, a coherence time estimator 106, an adjustable filter 108 and a phase rotation unit 110. The input to each RAKE finger 100 is provided to the correlator 101. The correlator 101 provides an output to the phase rotation unit 110 and to the channel estimator 104. The output of the channel estimator 104 is provided to the adjustable filter 108 and to the coherence time estimator 106. The output of the coherence time estimator 106 is connected to another input of the adjustable filter 108. The adjustable filter output is connected to another input of the phase rotation unit 110. The output of each phase rotation unit 110 is connected to the input of a delay equalizer 150. The output of each delay equalizer 150 is input to a combiner 38.

It should be appreciated that the combiner 38 also provides a demodulation function. In other embodiments of the present invention, the output of the combiner 38 may be input to a separate demodulator. The output of the combiner 38 is connected to the input of the bit detector 42 as shown in FIG. 1.

The RAKE receiver 34 also comprises a sounding block 114 (sometimes referred to as a searcher) which searches through the received signals to ascertain when each multipath propagation reaches the mobile station, or if there is base station diversity to ascertain when the respective signals from the base stations reach the mobile station. Base station diversity occurs, for example, during soft handoff where more than one base station is sending the same signal to the same mobile station. Sounding blocks are well known in the art and accordingly the specific structure of the sounding block will not be described. Any suitable method can be used to perform this sounding such as fast Fourier transforms etc.

Figure 5:
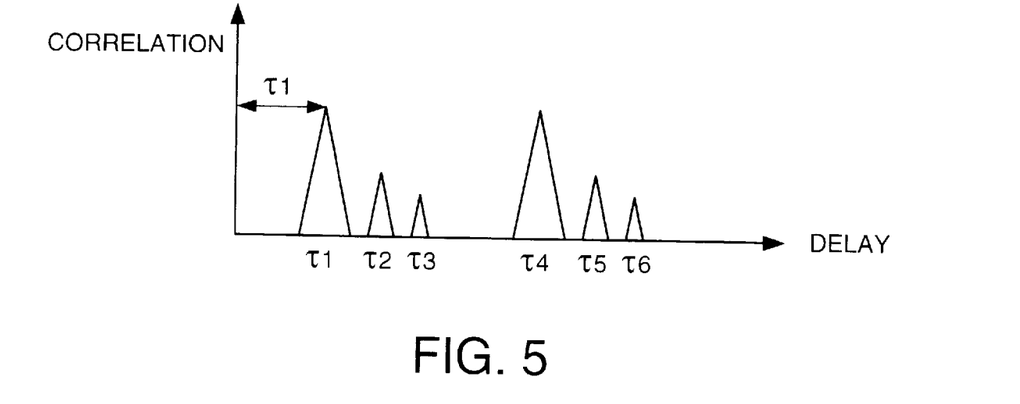
FIG. 5 illustrates how the different multipath signals are identified.

However the function of the sounding block will be described. The sounding block 114 effectively correlates the received signal with the respective code but with a variety of delays. The results of a typical sounding correlation are shown in FIG. 5. As can be seen, the first correlation is obtained when the code is delayed with respect to the received signal by relative delay $\tau 1$. The next two correlations, which are decreasing in size are obtained when the relative delays are $\tau 2$ and $\tau 3$ respectively. Another large correlation is obtained when the relative delay is $\tau 4$. This is followed by two decreasingly strong correlations $\tau 5$ and $\tau 6$ respectively. The first correlation peak corresponds to the strongest multipath signal received from a given base transceiver station with the second and third peaks corresponding to two multipath propagations of the same signal from the same base station. The fourth peak corresponds to the strongest multipath signal received from a second base transceiver station which is probably further from the mobile station than the first base transceiver station. The fifth and sixth peaks correspond to multipath propagations of the signal received from the second base transceiver station. Typically, these multipath propagations from any given base station will be grouped together and can easily be distinguished from a second group of signals which come from a second base transceiver station. In other words, the sounding block 114 determines the different phases (or delays) for each multipath propagation and these delays are sent to the respective fingers of the RAKE receiver 34 allocated to deal with a particular multipath propagation.

Once the sounding block 114 has ascertained the delays at which the correlation peaks are obtained, these delays are provided to different fingers. For example, if there are six fingers, the first finger will correlate the received signal with the code having delay $\tau 1$, the second signal will correlate the signal with the code having a delay $\tau 2$, the third finger will correlate the signal with the code having a delay $\tau 3$ and so on. If there are more correlation peaks than fingers, the sounding block may be arranged to select the strongest signals for allocation to the respective fingers. The assigned delay for each finger 101 is output to the correlator of the respective finger via lines $124_{1-n}$.

The sounding block 114 also provides outputs 149 to respective delay equalizers 150 of each RAKE finger 100. The outputs 149 provided by the sounding block 114 to the delay equalizers 150 ensure that the outputs of the respective fingers 100 are synchronised and can be combined meaningfully by the combiner 38. For example, if there were only three fingers which are allocated to process the peaks which occur at delay time $\tau 1$, $\tau 2$ and $\tau 3$, it is arranged so that the output from each finger occurs at the same time so that the signals can be superimposed by the combiner 138 with the peaks occurring at delays $\tau 1$, $\tau 2$ and $\tau 3$ coinciding. Thus the peak with delay $\tau 1$ will be delayed by a time period of $\tau 3 - \tau 1$ with respect to the peak with delay $\tau 3$. Likewise, the second peak will be delayed by a time period of τ3−τ2 with respect to the peak with delay τ3. Thus the peaks corresponding to delays τ1, τ2 and τ3 will be output by the respective fingers to the combiner 38 at the same time As will be apparent, the code generator 22 provides an input to the sounding block 114 via line 120 as well as to each correlator 101 via line 122 of the respective fingers 100.

Each correlator 101 of each finger 100 receives the output from the A/D converter 32 via line 33, the associated code from the code generator 22 via line 122 and the assigned delay from the sounding block 144 via line 124. Each correlator 101 correlates the received signal with the code from the code generator 22, the code having been delayed by the amount determined by the sounding block 114 and assigned to the particular finger 100. The correlators 101 thus despread the received signal.

The output of the correlator 101 of each finger is input to the channel estimator 104. When a signal is transmitted between a base station and the mobile station (either on the uplink or the downlink), the signal receiving unit needs to establish from the signal which it has received some information about the communication path along which the signal has travelled. This is referred to as "channel estimation" and is carried out in a channel estimator 104 unit which generates a channel impulse response. Various techniques are known for channel estimation. The channel impulse response is required in order to properly decode and demodulate the incoming data.

The channel estimator 104 therefore estimates the channel impulse response for the received and correlated signal. The channel estimation may be based on pilot symbols in the received signal. The pilot symbols can be regarded as reference signals. The channel estimator 104 will correlate the received pilot symbols with reference pilot symbols which are available in the receiver. The correlation effectively allows a comparison to be made between the pilot symbols which should be received and the pilot symbols which are actually received. The channel estimate determined by the channel estimator 104 is also used to control the adjustable filter 108 as well as by the coherence time estimator 106 to estimate the coherence time of the channel.

The coherence time of a channel is the interval over which a transmitted symbol will be relatively undisturbed by fluctuations in the channel. Fluctuations in the channel may be caused by movement of the mobile station which might be in a moving vehicle or by changes in the radio environment. The coherence time estimator 106 is arranged to estimate the coherence time of the channel and the components of the coherent time estimator 106 will be described with reference to FIG. 4.

The coherence time is based on the estimated speed of the mobile station. Generally, the faster that the mobile station moves the shorter the coherence time. The speed of the mobile station can be estimated in a number of different ways. A preferred method of estimating the speed of the mobile station is described in relation to the coherence time estimator 106 shown in FIG. 4.

Figure 4:
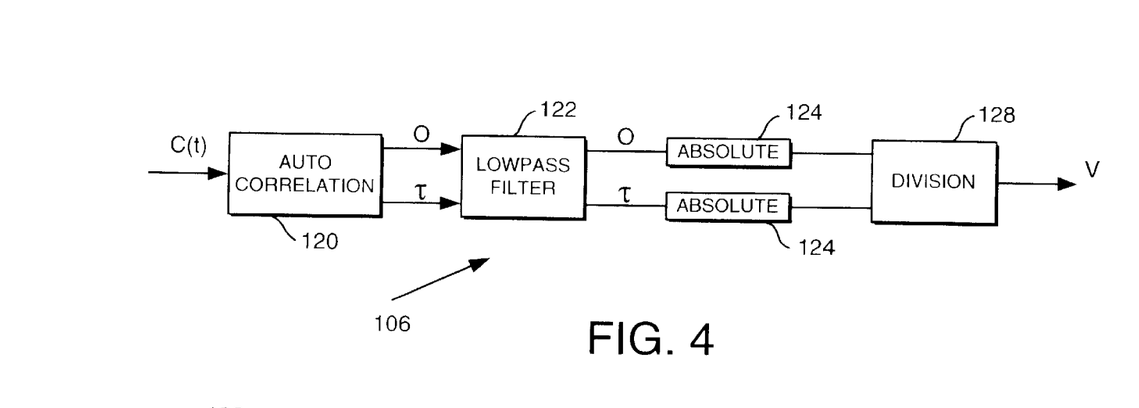
FIG. 4 shows a schematic diagram of the components of the coherence time estimator of FIG. 3.

The coherence time estimator 106 comprises an autocorrelation unit 120, the input of which is connected to the output of the channel estimator 104. The output of the autocorrelation unit 120 provides two outputs which are input to a low pass filter unit 122. The low pass filter unit 122 has two outputs, each of which is connected to a respective absolute block 124 and 126. The output of each of the absolute blocks 124 and 126 is input to a division unit 128.

The output of the division unit 128 is connected to one input of the adjustable filter 108.

The channel impulse response calculated by the channel estimator 104 is input to the autocorrelation unit 120. An autocorrelation function is then performed on the channel impulse response. In other words, the input channel impulse response is therefore correlated with itself. The autocorrelation of the channel impulse response is taken with delays of 0 and τ. In other words the channel impulse response is correlated with itself in one case with no delay between the two versions of the channel impulse response and in the other case with one version of the channel impulse response being delayed with respect to the other version of the channel impulse response by time τ. The results of these two autocorrelations are output on the respective outputs of the autocorrelation unit 120 to the low pass filter unit 122. The low pass filter unit 122 averages the autocorrelations performed by the autocorrelation unit 122 to provide two average values. The first average value represents the average of the autocorrelations with no delay whilst the other value represents the average of the autocorrelations with the delay τ. The autocorrelation values obtained when there is no delay represent the maximum autocorrelation values.

The average autocorrelation value $R_c(0)$ with no delay can be represented as follows:

$$R_c(0) = E[c_0(t)c_0^*(t)]$$

where E represents the averaging function performed by the low pass filter unit 122, $c_0(t)$ is the channel impulse response provided by the channel estimator 104 and $C_o^*(t)$ is the complex conjugate value of the channel impulse response value. $C_o(t)C_o^*(t)$ is thus a complex multiplication giving an autocorrelation value.

The average autocorrelation value $R_c(\tau)$ with delay τ is as follows:

$$R_c(\tau) = E[c_0(t)c_0^*(t+\tau)]$$

The averaging of the respective autocorrelation values will reduce the effects of noise. The two average values are output by the respective outputs of the low pass filter unit 122 and are input to respective ones of the absolute blocks 124. The absolute blocks 124 calculate the absolute value (that is magnitude) of each of the averaged values. The calculated absolute values are output by the respective absolute blocks 124 to the division block 128. The division block 128 compares the two average values in order to provide a correlation coefficient p. In particular the division block 128 performs the following calculation.

$$P = \frac{|R_c(0)|}{|R_c(\tau)|}$$

p is thus a parameter which is proportional to the velocity of the mobile station. If the mobile station is not moving, then the two average values will be similar and p will be close to one. However the faster that the mobile station moves, the bigger the difference between the two average values. p will thus increase as the velocity of the mobile station increases. p is thus representative of the coherence time of the channel.

Figure 6:
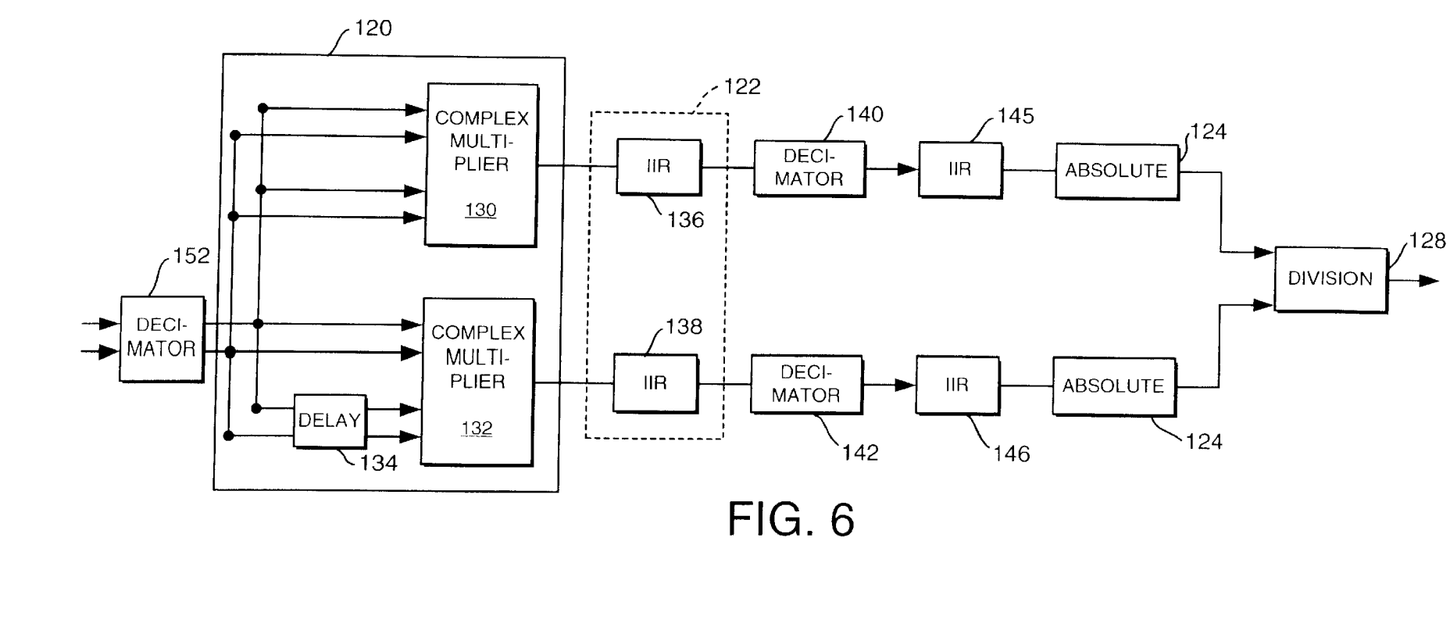
FIG. 6 shows one implementation of the coherence time estimator of FIG. 4.

FIG. 6 shows one way how the schematic arrangement of FIG. 4 can be implemented in practice. The output of the channel estimator 104 is input to a first decimator 152. It should be noted that the output of the channel estimator 104 is represented as two separate signals, one of which corresponds to the I component and one of which corresponds to the Q component. The decimator reduces the size of the input signals by discarding m out of every n bits. m and n can have any suitable values and in embodiment of the invention all of the non-pilot symbols in a time slot are discarded. It is possible, in one modification to this embodiment that all the non-pilot symbols and some of the pilot symbols be discarded for each time slot.

The first decimator 152 provides two outputs, again corresponding to the I and Q components of the signal. These two outputs are input to the autocorrelation unit 120 which includes a first complex multiplier 130 which provides the autocorrelation values with no delay and a second complex multiplier which provides the autocorrelation with delay τ. The first complex multiplier 130 receives the I component of the signal at two separate inputs and the Q component of the signal at two separate inputs. The second complex multiplier 132 has a first input for the I component of the signal and a second input for the Q component of the signal. The second complex multiplier also has two inputs connected to two outputs of a delay unit 134. The delay unit 134 receives at one input the I component and at a second input the Q component of the signal from the respective outputs of the first decimator 152. The delay unit 134 delays these signals by a time τ before outputting the I and Q components to the second complex multiplier 132. The autocorrelation functions are thus carried out by the first and second complex multipliers 130 and 132.

The output of the first complex multiplier 130 is output to a first infinite impulse response (IIR) filter 136. Likewise, the output of the second complex multiplier 132 is output to a second IIR filter 138. The outputs of the first and second IIR filters 136 and 138 are output to respective second and third decimators 140 and 142. The second and third decimators 140 and 142 provide the same function as the first decimator 152 although the values of m and n may be different. It should be noted that the values of m and n will be the same for the second and third decimators 140 and 142. The output of the second and third decimators 140 and 142 are input to the third and fourth IIR filters 145 and 146. The four IIR filters 136, 138, 145 and 146 and the second and third decimators 140 and 142 are arranged to average the results of the autocorrelations carried out by the autocorrelation unit 120. The third and fourth IIR filters 145 and 146 provide the actual averaging function.

The second and third decimators 140 and 142 reduces the number of samples which are passed to the third and fourth IIR filters 145 and 146 and thus the complexity of the third and fourth IIR filters can be reduced. The output of the third and fourth IIR filters are input to respective absolute blocks 124, as in FIG. 4. The outputs of the absolute blocks 124 are input to division unit 128 which performs the same function as that of FIG. 4. The most appropriate values of m and n for the first to third decimators 152, 140 and 142 can be determined experimentally.

The channel estimates provided by the channel estimator 104 are affected by noise. The adjustable filter 108 is provided to reduce the effects of noise. By filtering the channel estimates before they are used to correct the phase of the signal in the phase rotation block 110, the results of the phase rotation block 110 will be more accurate. In other words the adjustable filter improves the signal to noise ratio of the channel estimates.

The adjustable filter 108 is thus arranged so that its operational characteristics is altered in response to the coherence time estimated by the coherence time estimator 106 for the particular propagation path which is being dealt with by that RAKE finger 100. More particularly, the operation of the adjustable filter 108 is altered to take into account the current value of the correlation coefficient. The adjustable filter 108 then filters the channel estimates calculated by the channel estimator 104. It should be appreciated that each RAKE finger 100 considers a single propagation path at a time. The adjustable filter 108 is a therefore a programmable filter which is programmed in accordance with the estimated coherence time.

Figure 7:
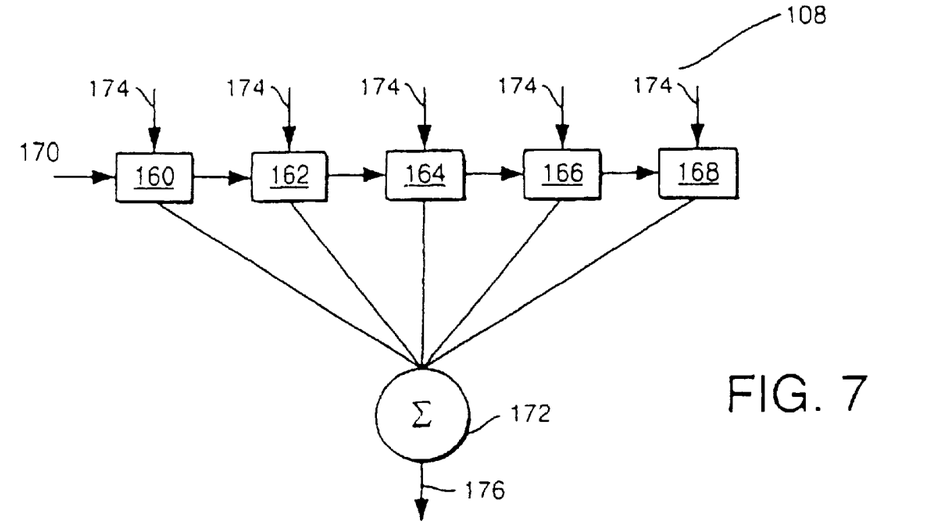
FIG. 7 shows one implementation of the adjustable filter of FIG. 3.

Reference is made to FIG. 7 which schematically shows one type of filter which may be used in embodiments of the present invention. The filter 108 comprises a number of delay blocks 160–168. The number of delay blocks can be varied as required. However, for illustrative purposes only, the filter 108 of FIG. 7 is provided with five delay blocks 160–168. The input 170 to the filter 108 is connected to the first delay block 160 which has two outputs, one of which is connected to the second delay block 162 and the other of which is connected to a summing unit 172. Likewise the second delay block 162 has two outputs, one of which is connected to the third delay block 164 and the other of which is connected to the summer 172. The third and fourth delay blocks 164 and 166 each have two similar outputs. The fifth delay block 168 has a single output which is connected to the summer 172. Each delay block has a second input 174 which provides the allocated coefficient for the particular delay block. This general structure is used by FIR (finite impulse response) filters, IIR filters and Wiener filters which can all be used in embodiments of the present invention. The different functions achieved by these filters is achieved by the coefficients applied to the delay blocks 160–168. The output of the filter 108 is supplied by the output 176 of the summer 172 which sums the outputs of each of the delay blocks 160–168.

The adjustable filter 108 which provides a smoothing function may be as mentioned hereinbefore a flat FIR filter, an IIR filter, a Wiener filter or any other suitable type of filter. The adjustable filter can therefore also be referred to as a smoother or a smoothing filter. In Wiener filters, the coefficients used are adapted to the particular Doppler spectrum. The coefficient p may be used to alter these coefficients and/or the number of taps used. A flat FIR filter is an average where every tap coefficient has the same value. For example in a 20 tap filter, each filter coefficient will have the same value which, for example may be 0.05. In embodiments of the present invention which use a flat FIR filter, the number of taps used will be varied in accordance the coherence time estimate provided by the coherence time estimator 106.

A Wiener filter attempts to obtain a optimal channel estimate by passing the channel estimates through a linear phase filter which minimizes the mean square error of the signal. Such a function can be difficult to implement in practice and a adjustable linear phase, low pass filter with a cut off frequency grater than or equal to the maximum possible Doppler frequency may be used.

Figure 8A:
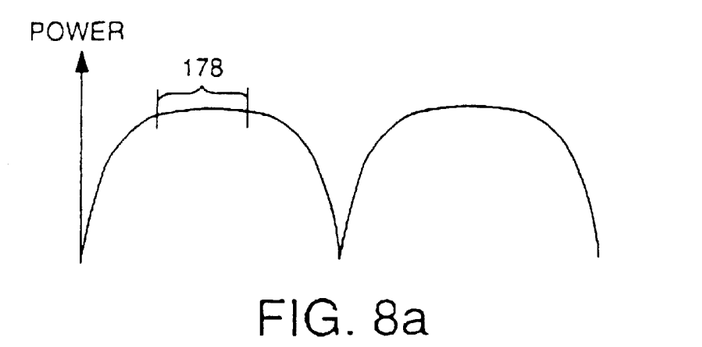
FIG. 8a shows the characteristic of a channel with a long coherence time.
Figure 8B:
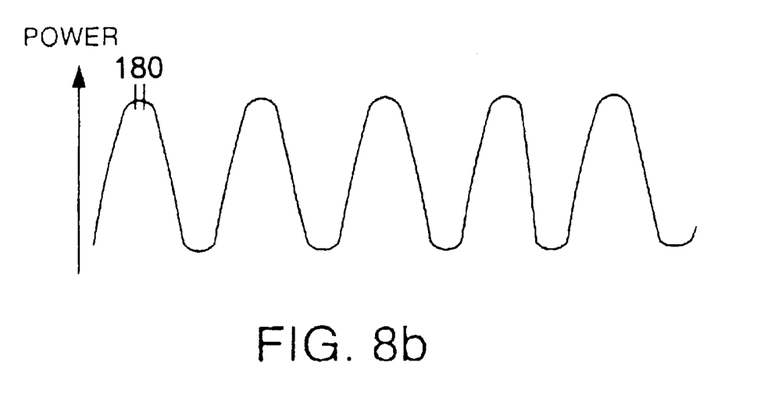
FIG. 8b shows the characteristic of a channel with a short coherence time.

Reference will now be made to FIGS. 8a and 8b which respectively shows a channel with a long coherence time and a short coherence time. The longer coherence time (fading rate) is obtained with slower moving mobile stations whilst the shorter coherence time is obtained with faster moving stations. The y axis of FIGS. 8a and 8b represents power. Referring first to FIG. 8a, the time period over which channel estimates should be made is indicated by region 178 where the values are relatively constant. Therefore the filter 108 will use a relatively large number of values in order to determine the filter output 176. Thus all the delay blocks may be used and the tap coefficients for each delay block may be quite similar. Referring next to FIG. 8b, the time period over which channel estimates should be made is indicated by region 180, again where the values are relatively constant. However region 180 is much shorter than region 178. Therefore fewer delay blocks will be used. For example some of the coefficients for the delay blocks will be 0. In both examples, the non zero coefficients will be selected in accordance with the length of regions 176 and 180 which represent the coherence time of the respective channel. In both examples, if the size of the regions 176 and 180 were to be increased to be longer than the channel coherence time, the channel estimates would be inaccurate and would provide inaccurate results as the channel estimates would no longer correspond to the channel impulse response.

In a RAKE receiver, the RAKE receiver effectively collects signal energy from different delay paths of the channel which are combined by the combiner 38. Each individual path is assumed to introduce an independent fading characteristic. As discussed hereinbefore n different delay or propagation paths may be present. It is possible to perform maximum ratio combining of the different delay paths. Maximum ratio combining effectively weights the signals before the signals are combined so that the strongest signals are given most weight. This accuracy of this calculation will depend on the accuracy of channel estimates which are calculated by the channel estimators 104. The adjustable filter 108 will therefore smooth the channel estimates obtained by the channel estimator 104. The channel estimates provided by the channel estimator 104 are output to the coherence time estimator 106 which uses the estimates to estimate the coherence time and also to the adjustable filter 108 which then filters the taps. As discussed hereinbefore, the characteristics of the adjustable filter 108 will depend on the coefficient calculated by the channel coherence time estimator 106.

The combiner 38 coherently combines the signal provided by each of the RAKE fingers 100. Coherent combination is possible due the presence of the phase rotation unit 110 in each finger 100. In particular, in coherent combination, the phase of the signal provided by each finger is the same. It should be appreciated that in alternative embodiments of the present invention non-coherent combining can take place. The phase rotation unit 100 causes the correlated output provided by the correlator 101 to be multiplied by the filtered channel estimates output by the adjustable filter 108. The function of the delay equalizer 150 which is arranged between the phase rotation unit and the combiner 38 has been described hereinbefore. Thus the phase rotation unit 100 ensures that the signals which are to be combined have the same phase whilst the delay equalisers 150 ensure that the signals to be combined are delayed with respect to each so that corresponding parts of the signals are output from the delay equalizers 150 at the same time.

The combiner 38 can use any suitable algorithm for combining the signals. For example, different weighting factors can be used with the signals from different fingers. In one embodiment of the present invention, the estimate provided by the combiner 38 for the transmitted data signal is as follows:

$$\sum \text{signal for one propagation path} \times \text{complex conjugate of channel tap complex estimate}$$

Each finger 100 provides the result of the signal for a given propagation path x the complex conjugate of the channel tap complex estimate. The results from each finger 100 are then summed.

The system shown in FIG. 4 or FIG. 6 for estimating the coherence time of a channel can be implemented in a digital signal processor which also provides other processing functions for the receiver. Alternatively, separate components or a separate processor may be provided to estimate the coherence time for each finger.

In one modification to the embodiment described hereinbefore, a linear interpolator may be added after the adjustable filter to interpolate the values of the estimates between two consecutive time slots.

In the described embodiments of the present invention, the estimate of the coherence time of the channel is based on the estimate speed of the mobile station. However any other suitable technique can alternatively be used to measure the coherence time of the channel.

In embodiments of the invention, the correlating function of the sounding block may be achieved with matched filters. It is also possible that the correlator in each finger may be replaced by matched filters.

The channel estimate may be based on data symbols instead of pilot symbols. Alternatively, the estimates may be based on pilot and data symbols.

It should be noted that any other suitable method for estimating the speed of the mobile station or a parameter indicative of the speed instead of the particular method described hereinbefore can be used.

The filter function provided by the adjustable filter can be implemented using any other suitable filter construction instead of the filter construction shown in FIG. 7.

It should be appreciated that whilst embodiments of the present invention have been described in relation to mobile stations, embodiments of the present can also be incorporated in base transceiver stations. The base transceiver stations may be mobile or stationary. Additionally, embodiments of the present invention may be incorporated in fixed devices which may communicate with base stations or the like. Where embodiments of the present invention are incorporated in stationary devices, advantages may still be achieved in that the radio environment itself may be changing due to the movement of for example traffic or the like.

Embodiments of the present invention are particularly applicable to code division multiple access systems and wideband code division multiple access systems. However embodiments of the present invention can be used with virtually any other access system, such as other spread spectrum systems, time division multiple access systems, frequency division multiple access systems and hybrids of these access systems.

What is claimed is:

1. A receiver for receiving signals propagating along a plurality of propagation paths in a wireless communication system, said receiver comprising a plurality of receiver means, said plurality of receiver means receiving signals at respective ones of said receiver means from different ones of the propagation paths, each of said receiver means comprising filtering means and means for estimating the channel coherence time for the propagation path used by signals received by the respective receiver means, wherein the operation of the filtering means in each of the respective receiver means is altered in dependence on the coherence time estimate provided by the estimating means of the respective receiver means.

2. A receiver as claimed in claim 1, wherein said receiver is a RAKE receiver and said receiver means comprise fingers.

3. A receiver as claimed in claim 1, wherein tap coefficients for said filter means are alterable in dependence on the coherence time estimate.

4. A receiver as claimed in claim 1, wherein the number of taps used in said filtering means is alterable in dependence on the coherence time estimate.

5. A receiver as claimed in claim 1, wherein said filtering means has the characteristic that the mean square error of the signal is minimized.

6. A receiver as claimed in claim 5, wherein said filtering means of each receiver means comprises a Wiener filter.

7. A receiver as claimed in claim 5, wherein said filtering means of each receiver means comprises a finite impulse response filter.

8. A receiver as claimed in claim 5, wherein said filtering means of each receiver means comprises an infinite impulse response filter.

9. A receiver as claimed in claim 1, wherein the receiver is incorporated in a mobile station.

10. A receiver as claimed in claim 1, wherein the estimating means estimates the coherence time of the channel of the propagation path associated with the respective receiver means based on a parameter indicative of the movement of the mobile station.

11. A receiver as claimed in claim 10, wherein said parameter indicative of the movement of the mobile station is defined by a ratio of a first autocorrelation of a channel impulse response, with no delay, for the propagation path associated with a given receiver and a second autocorrelation of said channel impulse response with a given delay.

12. A receiver as claimed in claim 11, wherein said first and second-autocorrelations are average values.

13. A receiver as claimed in claim 1, wherein the output of said filtering means is used to control a phase alteration applied to the received signals.

14. A receiver as claimed in claim 1, wherein said estimating means is arranged to receive a plurality of channel impulse response estimates for said received signal, said channel impulse response estimates being used by said estimating means to estimate the channel coherence time.

15. A receiver as claimed in claim 1, wherein said receiver is incorporated in a base transceiver station.

16. A receiver as claimed in claim 1, wherein said receiver is arranged to receive signals in the code division multiple access format.

17. A receiver for receiving signals propagating along a plurality of propagation paths in a wireless communication system, said receiver comprising a plurality of receiver means, respective ones of said plurality of receiver means receiving signals from different ones of the propagation paths, each of said receiver means comprising adaptive filtering means for filtering said received signals and means for estimating channel coherence time for the respective path used by signals received by the respective receiver means, wherein the operation of said adaptive filtering means is altered in dependence on the coherence time estimate provided by the estimating means of the respective receiver means.

18. A receiver as claimed in claim 17, wherein said received signals are processed prior to passing through adaptive filtering means.

19. A receiver for use in a wireless communication system, said receiver comprising a plurality of receiver means, said plurality of receiver means each being arranged to receive signals from a different propagation path, each of said receiver means comprising adaptive filtering means for filtering said received signals, wherein the operation of said adaptive filtering means is altered in dependence on a characteristic of the signals from the propagation path received by the respective receiver means, and said characteristic is the channel coherence time for the propagation path used by said signals received by the respective receiver.

20. A receiver for use in a wireless communication system, said receiver comprising a plurality of receiver means, said plurality of receiver means each being arranged to receive signals from a different propagation path, each of said receiver means comprising adaptive filtering means for filtering said received signals, wherein the operation of said adaptive filtering means is altered in dependence on a characteristic of the signals from the propagation path received by the respective receiver means, said received signals are processed prior to passing through said adaptive filtering means, and said characteristic is the channel coherence time for the propagation path used by said signals received by the respective receiver.

21. A receiver for receiving signals propagating along a plurality of propagation paths in a wireless communication system, said receiver comprising a plurality of receiving channels, each of said channels having a phase rotator means adjustable to provide a desired phase increment and a delay unit adjustable to provide a delay to signals propagating in the channel, wherein the delays of the respective channels are made commensurate with respective delays of signals propagating along different propagation paths, each of said receiving channels further comprising coherence means for estimating the channel coherence time, wherein the coherence times of the respective channels are measured respectively for the signals propagating along respective ones of the propagation paths, wherein the phase rotator means of the respective channels are operated to provide phase increments to signals of respective ones of the channels corresponding to the respective values of the coherence times.

\* \* \* \* \*